(12) United States Patent
Nagafuji

(10) Patent No.: US 8,315,312 B2
(45) Date of Patent: Nov. 20, 2012

(54) IP STREAM COMMUNICATING SYSTEM, IP STREAM RECEIVING APPARATUS AND RECEPTION PROCESSING TIMING SYNC METHOD FOR USE IN IP STREAM RECEIVING APPARATUS

(75) Inventor: Nobuyuki Nagafuji, Tokyo (JP)

(73) Assignee: NEC Corporation, Tokyo (JP)

( * ) Notice: Subject to any disclaimer, the term of this patent is extended or adjusted under 35 U.S.C. 154(b) by 672 days.

(21) Appl. No.: 12/397,120

(22) Filed: Mar. 3, 2009

(65) Prior Publication Data

US 2009/0225791 A1 Sep. 10, 2009

(30) Foreign Application Priority Data

Mar. 5, 2008 (JP) ................................. 2008-054241

(51) Int. Cl.
*H04B 1/66* (2006.01)
*H04N 5/04* (2006.01)
(52) U.S. Cl. .................................. 375/240.25; 348/500
(58) Field of Classification Search ............. 375/240.25, 375/240.23, 240.22, 240.01, 240.26; 348/465, 348/473, 461, 463, 584, 397, 409, 410, 415, 348/420, 422, 426, 437, 438, 500; 370/509, 370/390, 538, 485, 486, 487, 471, 473, 389, 370/395
See application file for complete search history.

(56) References Cited

U.S. PATENT DOCUMENTS

| | | | |
|---|---|---|---|
| 5,440,346 A * | 8/1995 | Alattar et al. ............. | 375/240.24 |
| 7,155,532 B2 * | 12/2006 | Schoenblum ................. | 709/231 |
| 2002/0003799 A1 | 1/2002 | Tomita | |
| 2005/0135368 A1 | 6/2005 | Nakamura | |
| 2005/0166123 A1 * | 7/2005 | Yanamoto et al. ............. | 714/776 |
| 2008/0049846 A1 * | 2/2008 | Nagafuji ................... | 375/240.28 |
| 2008/0219296 A1 | 9/2008 | Le Ludec Benoit et al. | |
| 2008/0310460 A1 * | 12/2008 | Bargauan ...................... | 370/522 |
| 2009/0034627 A1 * | 2/2009 | Rodriguez et al. ........ | 375/240.26 |
| 2011/0188501 A1 * | 8/2011 | Kim et al. ..................... | 370/390 |

FOREIGN PATENT DOCUMENTS

| | | |
|---|---|---|
| JP | 2001320413 A | 11/2001 |
| JP | 2005151463 A | 6/2005 |
| JP | 2005210219 A | 8/2005 |
| JP | 2006014089 A | 1/2006 |
| JP | 2007104040 A | 4/2007 |
| JP | 2007221676 A | 8/2007 |
| WO | 2006075007 A1 | 7/2006 |

OTHER PUBLICATIONS

Japanese Office Action for JP2008-054241 mailed on Sep. 25, 2012.

* cited by examiner

*Primary Examiner* — Behrooz Senfi

(57) ABSTRACT

The invention provides an IP stream communicating system having a receiving apparatus which, when a reception IP (Internet Protocol) stream is inputted, performs at a reception processing timing at least FEC (Forward Error Correction) decoding processing that takes place immediately after reception of the reception IP stream, the IP stream receiving apparatus including:
a PCR extracting circuit which extracts a PCR (Program Clock Reference) that has been periodically added into the reception IP stream;
an RTP (Real-time Transport Protocol) information extracting circuit which extracts RTP information from an RTP header in the reception IP stream; and
a sync calculating circuit which generates block sync of the FEC decoding processing based on PCR information extracted by the PCR extracting circuit and the RTP information extracted by the RTP information extracting circuit.

18 Claims, 20 Drawing Sheets

IP STREAM COMMUNICATING SYSTEM, IP STREAM RECEIVING APPARATUS AND RECEPTION PROCESSING TIMING SYNC METHOD FOR USE IN IP STREAM RECEIVING APPARATUS

INCORPORATION BY REFERENCE

This application is based upon and claims the benefit of priority from Japanese patent applications No. 2008-054241, filed on Mar. 5, 2008, the disclosure of which is incorporated herein its entirety by reference.

BACKGROUND OF THE INVENTION

1. Field of the Invention

The present invention relates to an IP (Internet Protocol) stream communicating system, an IP stream receiving apparatus, and a reception processing timing sync method for use in the IP stream receiving apparatus, and in particular, to timing sync of reception processing of the IP stream.

2. Description of the Related Art

When video and audio streams and the like are transmitted/received in real-time over an IP network or the like, UDP (User Datagram Protocol) packets are generally used. For the video and audio streams, encoded data such as an MPEG2 (Moving Pictures Expert Group-2)-TS (Transport Stream) or non-compressed (PCM: Pulse Code Modulation) data is used.

The sync timing information (for example, TS time stamps or the like) in the IP stream communication processing is added using a protocol (for example, the RTP (Real-time Transport Protocol) or the like) defined at a higher level than the UDP. When sync timing is implemented in this way, an RTP header of the type shown in FIG. 10 may be added as the IP stream.

The IP stream shown in FIG. 10 is configured from an "IP header", a "UDP header", an "RTP header", and a "payload" (video, audio or the like), and the sync timing is inserted into the "RTP header". Note that the head portion of a sequence number in the RTP header or the like can be used in place of the above-described sync timing.

An example configuration of the system which communicates the IP stream is shown in FIG. 11. A video/audio transmission apparatus is configured to include a video/audio encoding processing circuit 31 which performs encoding processing on audio/video based on audio/video input and video frame sync, a TS (Transport Stream) time stamp adding circuit 32 which adds TS time stamps to MPEG2-TS packets (hereinafter referred to as TS packets) resulting from the encoding, and an FEC (Forward Error Correction) encoding circuit 33 which adds redundant packets to the TS packets, an RTP adding circuit 34 which adds RTP headers to the TS packets, and a UDP/IP transmitting circuit 35 which adds UDP headers and IP headers and transmits the resulting packets to an IP network 100.

Further, the video/audio receiving apparatus is configured to include a UDP/IP receiving circuit 41 which receives the IP packets from the IP network 100, removes the "IP header" and "UDP header" from the IP packets and outputs the resulting packets, an RTP removing circuit 42 which removes the "RTP header" from the outputted packets and outputs the resulting payloads, an FEC decoding circuit 43 which performs FEC decoding on TS packets of the payloads, a TS time stamp regenerating circuit 44 which regenerates the TS time stamps from the TS packets which have undergone error correction in the FEC decoding, and a video/audio decoding processing circuit 45 which performs decoding processing to recover the video/audio from the TS packets.

Sync timing (reception processing timing) of the IP stream is required in the FEC decoding processing and the like (block and framing processing) that takes place immediately on reception of the IP stream. Note that, here, "block" refers to a set of "n" TS packets. In the FEC decoding processing and the like, later-described error correction processing is performed to recover lost TS packets (see, for instance, Patent Document 1: Japanese Patent Laid-Open No. 2005-210219).

The above-described sync timing involves the following. On the transmitting side, a head byte arrival time of each TS packet is added as a TS time stamp (see FIG. 10) immediately before transmission. On the receiving side, the time stamps are regenerated by the TS time stamp regenerating circuit 44. Then, while referring to the TS time stamp information which has been added to the head of each TS packet, control is performed using FIFO (First In First Out) or the like to ensure that the packet interval is the same as at transmission (when the time stamp was added). In this case, the time stamp information is expressed using a 27 MHz, 32-bit (4-byte) count value. This type of TS stream is generally called a time-stamp-including TS (TTS).

FIG. 12 shows an example, which relates to the present invention, of adding the TS time stamp. In the case shown in FIG. 12, if the TS time stamp of a TS packet #0 is denoted to, the TS time stamp of a TS packet #1 is denoted t1 and a time at which the reading of TS packet #0 from the FIFO begins is denoted tA, the timing tB for reading the TS packet #1 from the FIFO is calculated by the following equation.

$$tB = tA + (t1 - t0)$$

In the FEC processing, a "linear code" such as a Reed-Solomon code or an LDPC (low density parity check) code can be generally used. The following briefly describes error correction operation at the packet level (one packet=code word of one bit), taking the LDPC code as an example.

First, on the transmitting side, when packets "0" to "6" are inputted in the FEC processing, the redundant packets "7" to "9" are created based on a predetermined check matrix as shown in FIG. 13. In this case, the redundant packet "7" is calculated as the exclusive OR of the packet "1", the packet "3" and the packet "5". The redundant packet "8" is calculated as the exclusive OR of the packet "2", the packet "4" and the packet "6". The redundant packet "9" is calculated by the exclusive OR of the packet "0", the packet "3" and the packet "6".

On the receiving side, when an IP stream in which the redundant packets "7" to "9" have been added and the packets "0", "3" and "6" have been lost as shown in FIG. 14 is received, an error list is created as zeroes are written in for the received packets based on the sequence numbers of the received packets. Here, an initial value of the error list is assumed to be '1'. Since the packets "0", "3" and "6" are lost in this case, the error list will be '1001001000'.

When the error list and the check matrix are compared, the error list is read from the top in order and if a weight ('1') exists in a "column of the check matrix" corresponding to '1' of the error list, that weight is defined as an "error weight" (encircled entries). Then the number of error weights is counted for each row (number of row error weights).

In the example shown in FIG. 14, the number of the row error weights in the first row of the check matrix is '1', the number of the row error weights in the second row of the check matrix is '1', and the number of the row error weights in the third row of the check matrix is '3'. Based on this result, it is determined that the first and the second rows of the check matrix can used in the recovery. Specifically, by taking the exclusive OR of the packets which correspond to first and second row weights in the check matrix which are ('1') but are not "error weights", the lost packets "3" and "6" are recovered. Thus, the lost packet "3" is recovered by taking the exclusive OR of the packet "1", the packet "5" and the packet "7". The lost packet "6" is recovered by exclusive OR of the packet "2", the packet "4" and the packet "8".

In FEC processing, the above described processing is called a "search", and the first "search" allows the lost packets "3" and "6" to be recovered. Next, according to the FEC processing, a second "search" is performed. Note, however, that because the lost packets "3" and "6" have been recovered, the error list is updated by writing '0' at the positions of the packet "3" and the packet "6" recovered.

The second "search" is performed in the same way. Specifically, the error list is compared with the check matrix, reading in order from the top of the error list. Any weights of "1" in "columns of the check matrix" that correspond to a '1' in the error list are defined as "error weights" (encircled entries), and the number of "error weights" in each row is counted (number of row error weights).

In the example shown in FIG. 15, the number of error weights in the first row of the check matrix is '0', the number of error weights in the second row of the check matrix is '0' and the number of error weights in the third row of the check matrix is '1'. From these results, it is determined that the third row of the check matrix can be used in the recovery. By taking the exclusive OR of the packets which correspond to third row weights in the check matrix with a value of ('1') which are not "error weights", the lost packet "0" is recovered. Thus, the lost packet "0" is recovered by taking the exclusive OR of the packet "3", the packet "6" and the packet "9".

As described above, in error correction processing such as LDPC, searches are repeatedly performed until no pattern that allows error correction is found. However, because the error correction processing time for the LDPC processing or the like is limited (to a single FEC block time), in real-time processing such as that shown in FIGS. 16 and 17, a correction start time must be stipulated for each FEC block. To achieve this, the correction start time of each FEC block is determined by the FEC outputting timing (=TS time stamp regenerating timing).

In the FEC processing shown in FIGS. 16 and 17, the "FEC input", the "FEC correction" and the "FEC output" are sequentially performed. First, the processing at the FEC input #1 is performed. When the processing for the FEC input #1 is finished, the processing for the FEC input #2 and the processing for the FEC correction #1 are performed. When the processing for the FEC input #2 is finished, the processing for the FEC input #3, the processing for the FEC correction #2 and the processing for the FEC output #1 are performed. Thus, in the FEC processing, the processing for each FEC input, FEC correction and FEC output are sequentially performed.

In the system communicating the IP streams shown in FIG. 11, it is possible to use the TTS time information which is attached to the TS packets to generate correct block sync, and consequently, to perform stable and effective processing in error correction and the like. As shown in FIG. 10, TTS is added to the head of each TS packet in the payload as time information with a resolution of 27 MHz.

However, in IP media transmission, unless a particular standard is being applied, there is no need to attach TTS, and so the configuration of a system, such as the one in FIG. 18, which communicates an IP stream without TTS may also be considered. The video/audio transmission apparatus in FIG. 18 is configured to include a video/audio encoding processing circuit 31, an FEC encoding circuit 33, an RTP adding circuit 34, and a UDP/IP transmitting circuit 35. The video/audio receiving apparatus includes a UPP/IP receiving circuit 41, an RTP time stamp regenerating circuit 42, an FEC decoding circuit 43, and a video/audio decoding processing circuit 45.

The video/audio transmitting apparatus and the video/audio receiving apparatus operate in the manner shown in FIGS. 19 and 20. In the system shown in FIG. 18, since TTS is not used, the time stamp of an RTP header (see FIG. 10) added by the RTP adding circuit 34 in the video/audio transmitting apparatus is regenerated by the RTP time stamp regenerating circuit 46 in the video/audio receiving device and used to generate the block sync.

In the above-described IP stream receiving apparatus relating to the present invention, the time stamp of the RTP header is regenerated and used to generate the block sync as shown in FIG. 20. The time information of the RTP header time stamp, however, has a resolution of only 90 KHz.

Consequently, an IP stream communicating system without TTS cannot perform the receiving sync with a resolution that is greater than or equal to the resolution of the time information the time stamp of the RTP header. This lack of resolution adversely affects the reception output quality. For example, even when the reception of the IP stream is stable, jitter at a maximum of 90 KHz occurs, making it difficult to achieve stable and effective processing for error correction and the like.

Specifically, it becomes difficult to secure sufficient error correction processing time. When the processing time for receiving a given block is extended as a result of network jitter (jitter at maximum of 90 KHz), it becomes difficult, for example, to secure enough time for the error correction of the block following the given block. When the error correction processing time is shortened, the number of search repetitions is reduced and the error correction capability is weakened.

SUMMARY

An exemplary object of the invention is to solve the above described problems by providing an IP stream communicating system, an IP stream receiving apparatus and a reception processing timing sync method for use in the IP stream receiving apparatus which, even when a time-stamp-including TS is not available, allow the receiving side to stably generate signal timing corresponding to the sync implemented on the transmitting side and allow stabilization of processing timing and error correction processing capability.

The IP stream communicating system according to the present invention has a receiving apparatus which, when a reception IP (Internet Protocol) stream is inputted, performs at a reception processing timing at least FEC (Forward Error Correction) decoding processing that takes place immediately after reception of the reception IP stream, the IP stream receiving apparatus including:

a PCR extracting circuit which extracts a PCR (Program Clock Reference) that has been periodically added into the reception IP stream;

an RTP (Real-time Transport Protocol) information extracting circuit which extracts RTP information from an RTP header in the reception IP stream; and a sync calculating circuit which generates block sync of the FEC decoding processing based on PCR information extracted by the PCR extracting circuit and the RTP information extracted by the RTP information extracting circuit.

An IP stream receiving apparatus according to the present invention uses, when a reception IP (Internet Protocol) stream is inputted, a reception processing timing to perform at least FEC (Forward Error Correction) decoding processing that takes place immediately after reception of the reception IP stream, the IP stream receiving apparatus including:

a PCR extracting circuit which extracts a PCR (Program Clock Reference) that has been periodically added into the reception IP stream;

an RTP (Real-time Transport Protocol) information extracting circuit which extracts RTP information from an RTP header in the reception IP stream; and a sync calculating circuit which generates block sync of the FEC decoding processing based on PCR information extracted by the PCR extracting circuit and the RTP information extracted by the RTP information extracting circuit.

In the reception processing timing sync method according to the present invention, an IP stream receiving apparatus which, when a reception IP (Internet Protocol) stream is inputted, performs at a reception processing timing at least FEC (Forward Error Correction) decoding processing that takes place immediately after reception of the reception IP stream, including:

PCR extracting processing for extracting a PCR (Program Clock Reference) that has been periodically added into the reception IP stream;

RTP (Real-time Transport Protocol) information extracting processing for extracting RTP information from an RTP header in the reception IP stream; and sync calculating processing for generating block sync of the FEC decoding processing based on PCR information extracted in the PCR extracting processing and the RTP information extracted in the RTP information extracting processing.

A recording medium having recorded therein a program according to the present invention causes a computer in an IP stream receiving apparatus which, when a reception IP (Internet Protocol) stream is inputted, performs at a reception processing timing at least FEC (Forward Error Correction) decoding processing that takes place immediately after reception of the reception IP stream, to execute:

PCR extracting processing for extracting a PCR (Program Clock Reference) that has been periodically added into the reception IP stream;

RTP (Real-time Transport Protocol) information extracting processing for extracting RTP information from an RTP header in the reception IP stream; and sync calculating processing for generating block sync of the FEC decoding processing based on PCR information extracted in the PCR extracting processing and the RTP information extracted by the RTP information extracting processing.

EXEMPLARY EMBODIMENT

Figure 1:
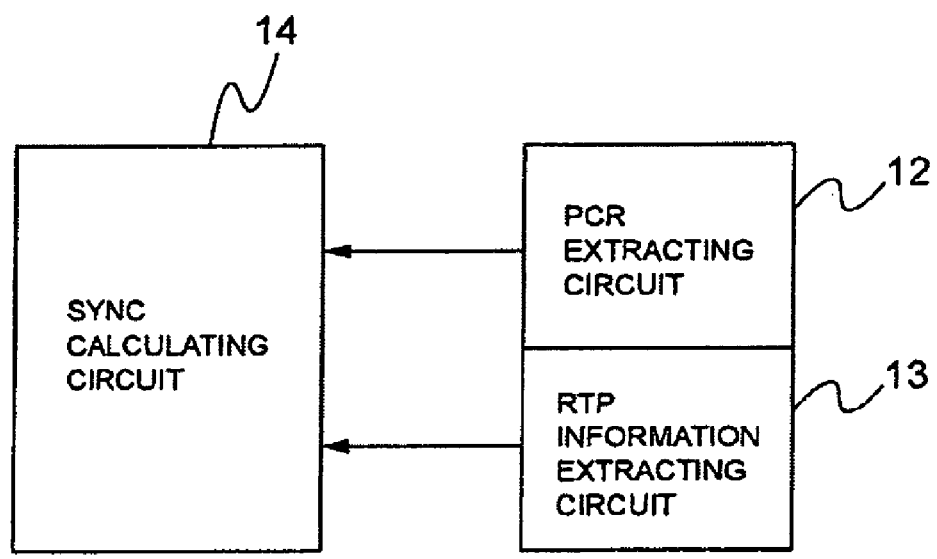
FIG. 1 is a block diagram for describing operating principles of an IP stream receiving apparatus according to the present invention.

Firstly, before beginning a description of the exemplary embodiment of the present invention, the operating principles of the present invention are described. FIG. 1 is a block diagram for describing operating principles of an IP (Internet Protocol) stream receiving apparatus.

As shown in FIG. 1, an IP stream receiving apparatus according to the present invention is an apparatus which, when a reception IP stream is inputted, performs at a reception processing timing at least FEC (Forward Error Correction) decoding processing that takes place immediately after reception of the reception IP stream. The IP stream apparatus is configured to include a PCR extracting circuit 12, an RTP information extracting circuit 13 and a sync calculating circuit 14.

Next, the operations of the IP stream receiving apparatus according to the present invention are described. The PCR extracting circuit 12 extracts a PCR (Program Clock Reference) that has been periodically added into the reception IP stream. The RTP (Real-time Transport Protocol) information extracting circuit 13 extracts RTP information from an RTP header in the reception IP stream. The sync calculating circuit 14 then generates block sync of the FEC decoding processing based on PCR information extracted by the PCR extracting circuit 12 and the RTP information extracted by the RTP information extracting circuit 13.

According to the present invention, through use of the configuration and operations described above, it is possible, even when a time-stamp-including TS is not available, for the receiving side to stably generate the signal timing of the sync implemented on the transmitting side and achieve stability in the processing timing and error correction processing capability.

Figure 2:
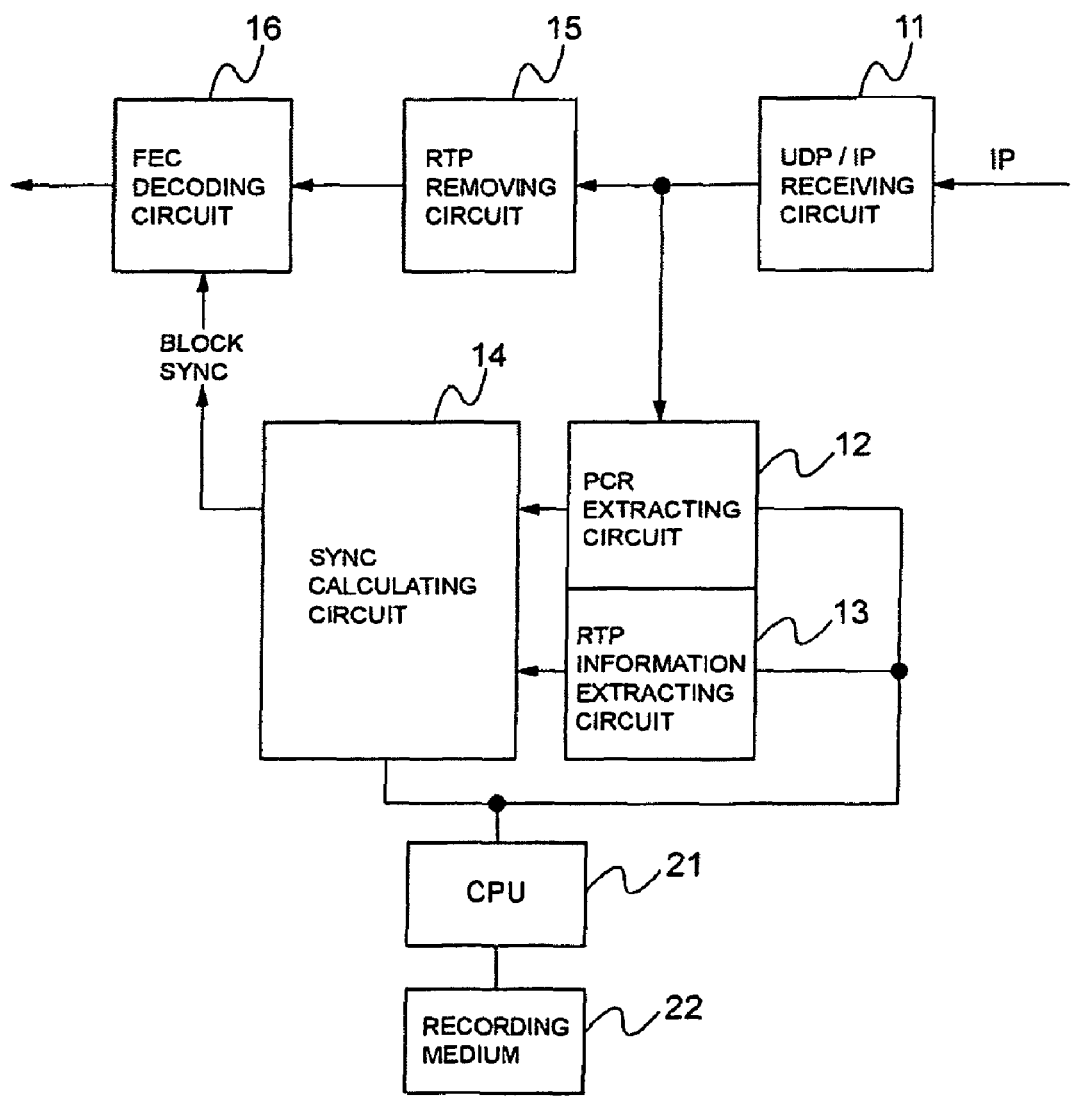
FIG. 2 is a block diagram showing an example configuration of an IP stream receiving apparatus according to the present invention.

Next, the exemplary embodiment; of the present invention is described with reference to the drawings. FIG. 2 is a block diagram showing an example configuration of an IP (Internet Protocol) stream receiving apparatus according to the present invention. As shown in FIG. 2, the IP stream receiving apparatus according to the present invention is configured to include a UDP (User Datagram Protocol)/IP receiving circuit 11, a PCR (Program Clock Reference) extracting circuit 12, an RTP (Real-time Transport Protocol) information extracting circuit 13, a sync calculating circuit 14, an RTP removing circuit 15, an FEC (Forward Error Correction) decoding circuit 16, a CPU (Central Processing Unit) 21 and a recording medium 22.

Note that the processing of the PCR extracting circuit 12, the RTP information extracting circuit 13, and the sync calculating circuit 14 may be realized by the CPU 21 executing a computer program stored in the recording medium 22. In the IP stream communicating apparatus according to the present invention, a video/audio transmitting apparatus and a video/audio receiving apparatus are described used as examples of the IP stream transmitting apparatus and the IP stream receiving apparatus.

On receiving the IP packets from an IP network not shown in the drawings, the UDP/IP receiving circuit 11 removes the UDP header and IP header from the IP packets and transmits the resulting packets to the RTP removing circuit 15. The RTP removing circuit 15 removes the RTP header from the received packets, from which the UDP header and IP header have been removed, to acquire the MPEG2 (Moving Pictures Expert Group-2)-TS (Transport Stream) packets (hereinafter referred to a TS packets), and sends the acquired TS packets to FEC decoding circuit 16.

The PCR extracting circuit 12 extracts PCR values from the packets from which the UDP header and the IP header have been removed (i.e. the packets before removal of the RTP header). The RTP information extracting circuit 13 extracts RTP information used to generate the block sync in the later-described sync calculating circuit 14 from the RTP header of the packets from which the UDP header and the IP header have been removed.

The sync calculating circuit 14 generates block sync based on PCR values extracted by the PCR extracting circuit 12 and the RTP information extracted by the RTP information extracting circuit 13. Based on the block sync generated by the sync calculating circuit 14, the FEC decoding circuit 16 performs FEC decoding on the TS packets from which the RTP header has been removed, and performs error correction on these TS packets.

Figure 18:
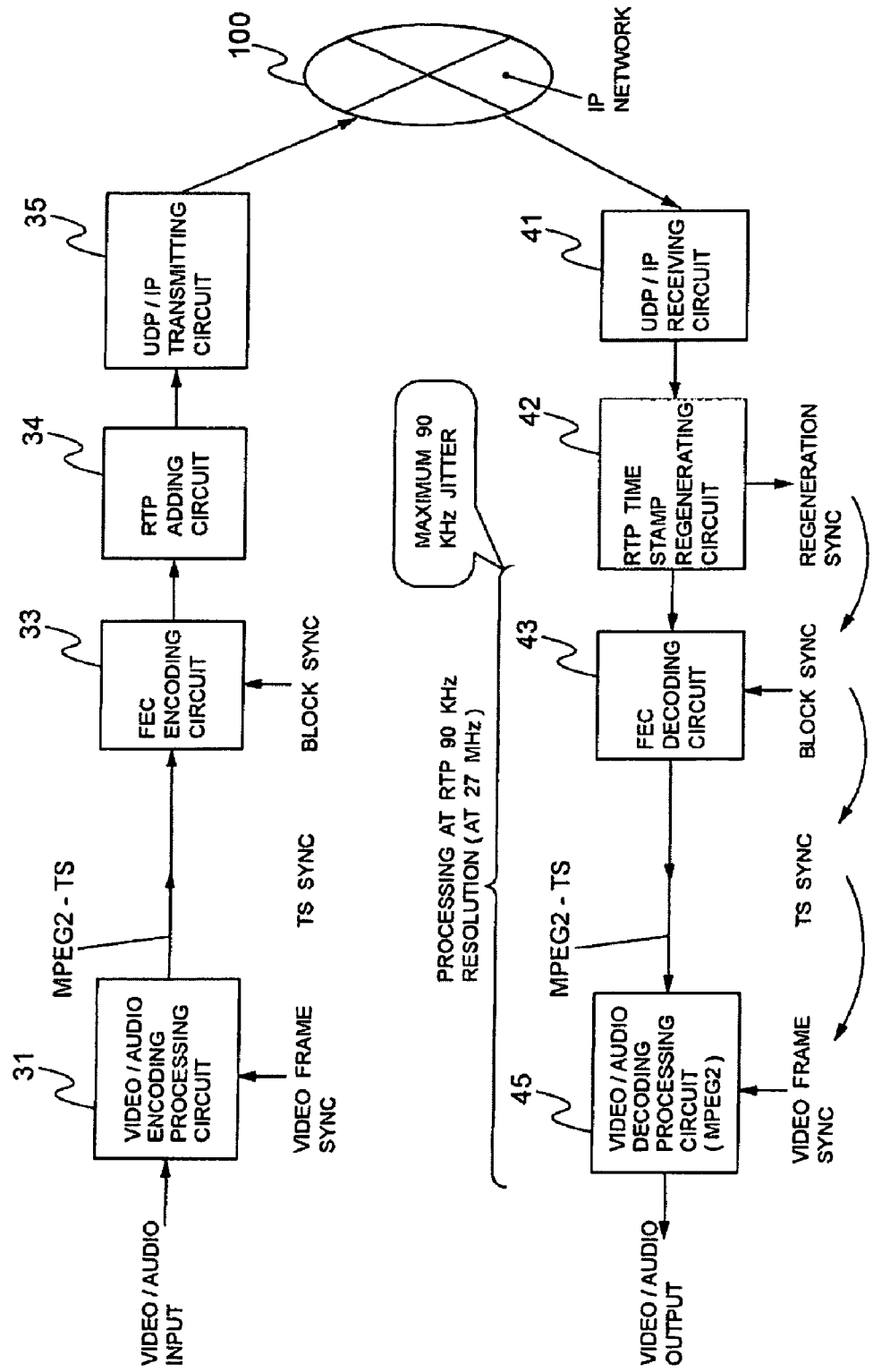
FIG. 18 is a block diagram showing an example configuration of a system which transmits/receives an IP stream without TTS, relating to the present invention.
Figure 19:
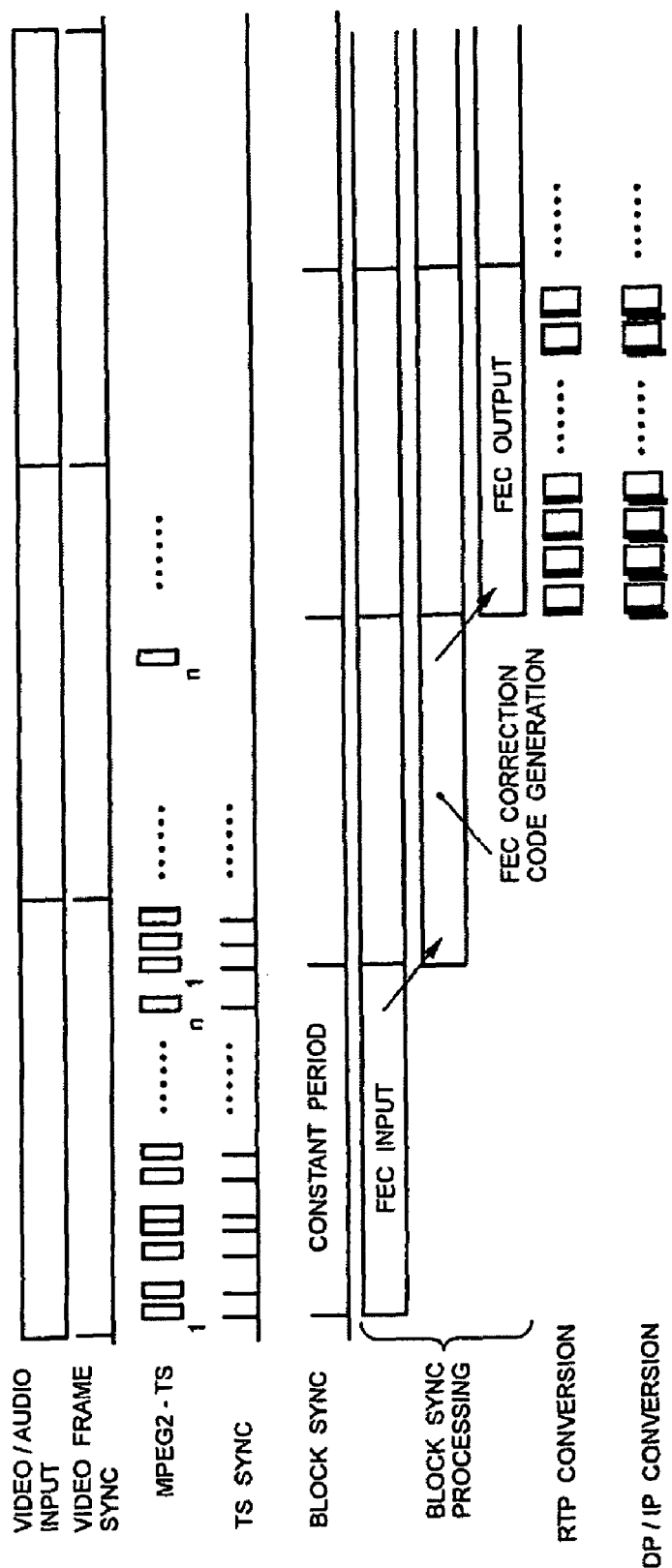
FIG. 19 is a timing chart showing operations on a transmitting side of the system which transmits/receives the IP stream without the TTS, relating to the present invention.
Figure 20:
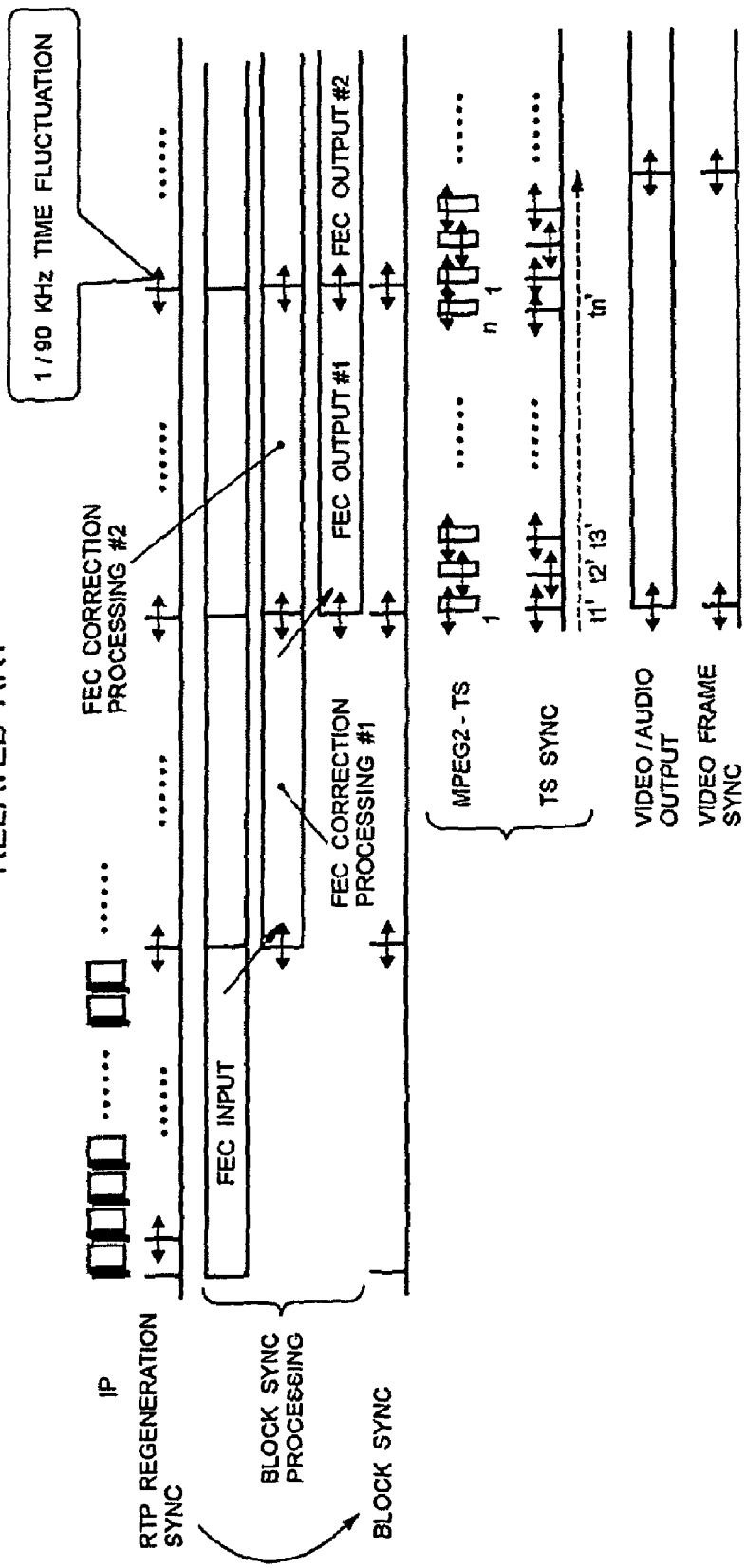
FIG. 20 is a timing chart showing operations on a receiving side of the system which transmits/receives the IP stream without the TTS, relating to the present invention.

Note that the IP stream transmitting apparatus of the IP stream communicating system according to the present invention is configured in the same way as the video/audio transmitting apparatus of the system which transmits and receives the IP stream without the TTS shown in FIG. 18, and so a further description and drawings of the IP stream transmitting apparatus is omitted.

Here, "PCR" is used to mean information for setting an STC (System Time Clock) value which is to be a time reference (i.e. sync information reference) in a decoder of the MPEG system to a value intended on the encoder side. The PCR information is written into an adaptation field in the TS header once every plurality of packets.

Figure 3:
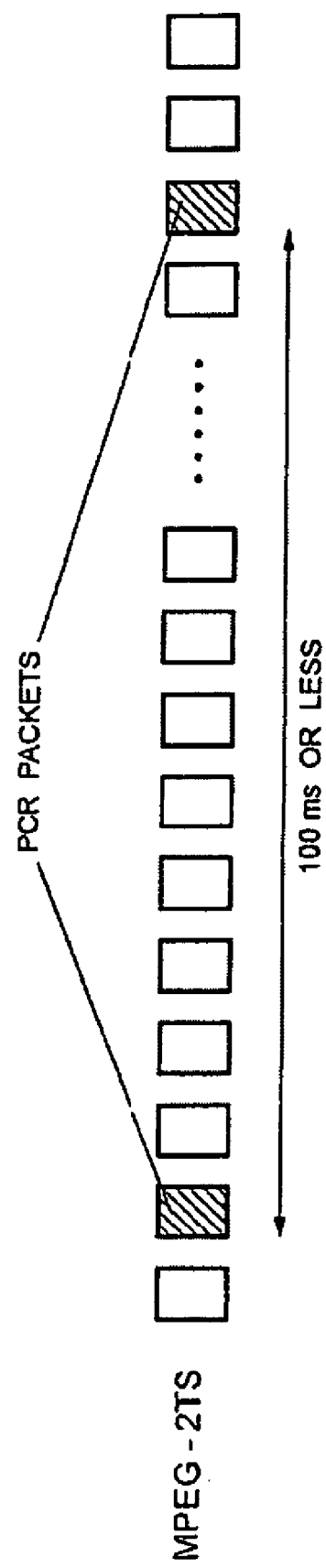
FIG. 3 is a diagram showing a PCR transmission period used in the present invention.

The PCR information is configured from a 9-bit PCR_EXT with a count of 300 at 27 MHz and a 33-bit PCR_BASE based on a 90 kHz frequency corresponding to a single period of the PCR_EXT. Note that under the terrestrial digital television transmission carrier standard (ARIB (Association of Radio Industries and Businesses of Japan) TR-B14), the PCR transmission period is defined to be 100 ms or less, as shown in FIG. 3.

In the present invention, the PCR information periodically added to the MPEG2-TS stream in the manner described above is used to generate high-accuracy RTP regeneration sync and FEC block sync so that even when the time-stamp-including TS is not available, it is still possible for the receiving side to stably generate the signal timing of the sync implemented on the transmitting side and achieve stability in the processing timing and error correction processing capability.

Figure 4:
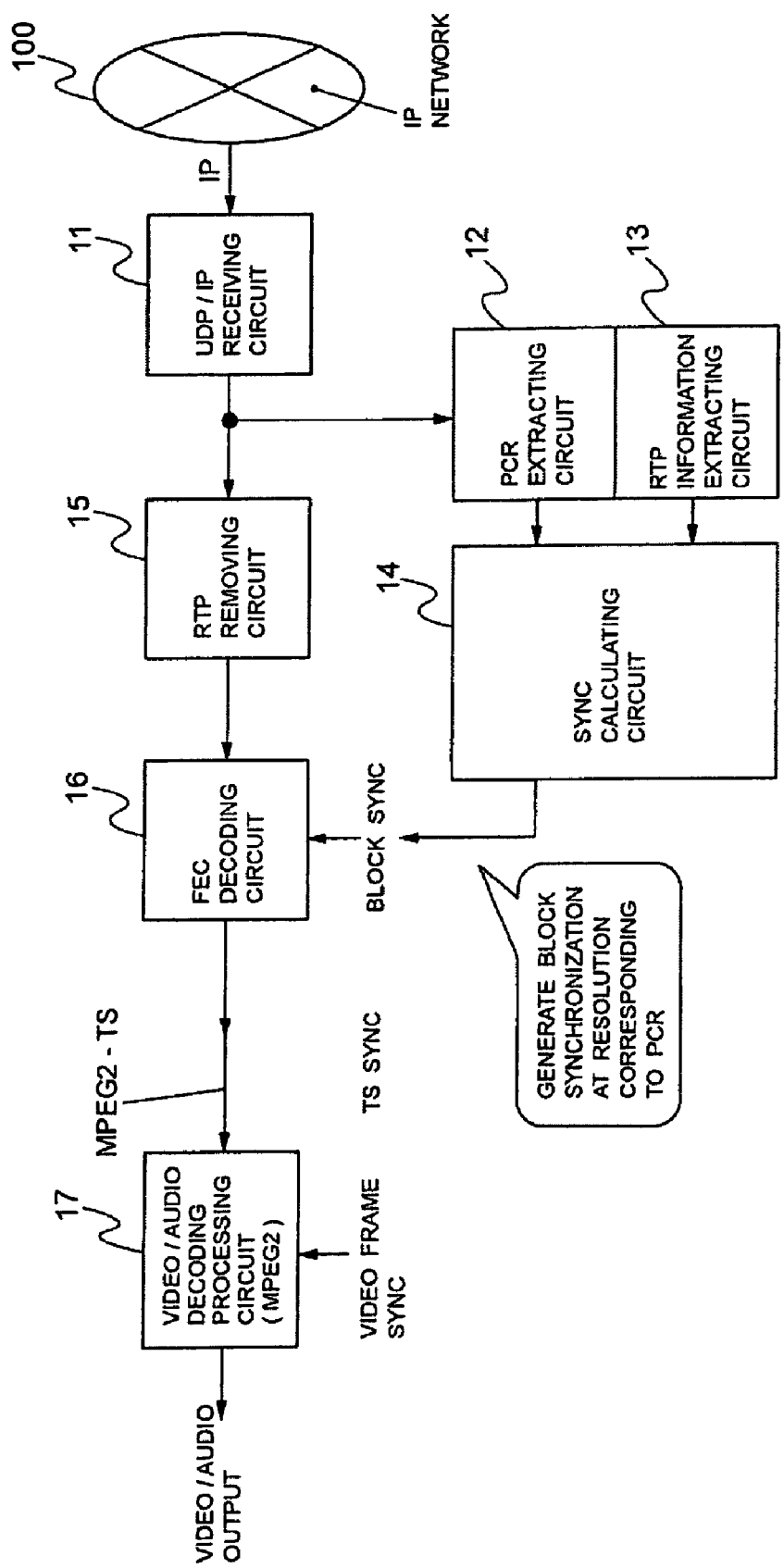
FIG. 4 is a block diagram showing an example configuration of a video/audio apparatus as the IP stream receiving apparatus according to an exemplary embodiment of the present invention.

FIG. 4 is a block diagram showing a configuration of the video/audio receiving apparatus as an example of the IP stream receiving apparatus of the IP stream receiving apparatus according to the exemplary embodiment of the present invention. As shown in FIG. 4, the video/audio receiving apparatus is configured to include a UDP/IP receiving circuit 11, a PCR extracting circuit 12, an RTP information extracting circuit 13, a sync calculating circuit 14, an RTP removing circuit 15, an FEC decoding circuit 16, and a video/audio decoding processing circuit (MPEG2) 17.

On receiving IP packets from the IP network 100, the UDP/IP receiving circuit 11 removes the UDP header and IP header from the IP packets and transmits the results to the RTP removing circuit 15. The RTP removing circuit 15 removes the RTP header from the packets from which the UDP header and IP header have been removed, acquires the TS packets, and sends the TS packets to the FEC decoding circuit 16.

The PCR extracting circuit 12 extracts the PCR from the packets from which the UDP header and IP header have been removed (i.e. from the packets prior to removal of the RTP header). The RTP information extracting circuit 13 extracts the RTP information used to generate the block sync in the later-described sync calculating circuit 14 from the RTP header of the packets from which the UDP header and the IP header have been removed.

The sync calculating circuit 14 generates block sync based on PCR values extracted by the PCR extracting circuit 12 and the RTP information extracted by the RTP information extracting circuit 13. Based on the block sync generated by the sync calculating circuit 14, the FEC decoding circuit 16 performs FEC decoding on the TS packets from which the RTP header has been removed, and performs error correction on the TS packets.

On receiving the (error-corrected) TS packets, the video/audio decoding processing circuit 17 performs video/audio decoding processing on the TS packets and outputs the resulting video/audio to another circuit not shown in the drawings. The video/audio decoding processing circuit 17 also regenerates video frame sync and outputs the result to a further circuit.

Here, on receiving the block sync from the sync calculating circuit 14, the FEC decoding circuit 16 executes the above-described FEC input processing, FEC correction processing and FEC output processing in accordance with the block sync.

Figure 5:
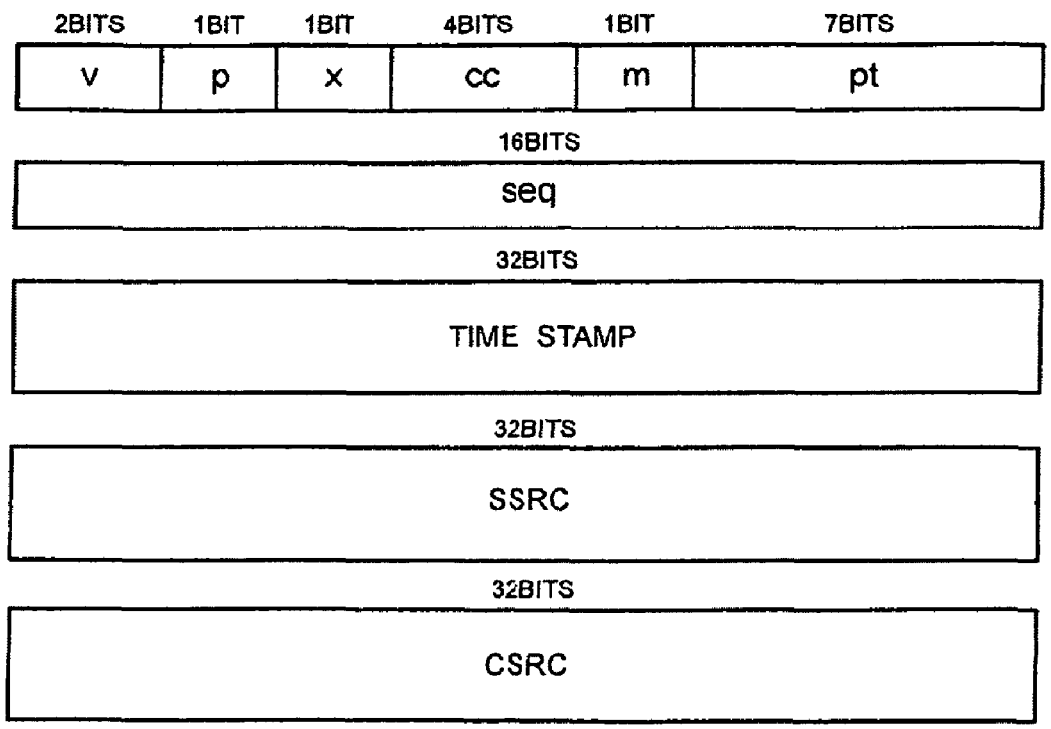
FIG. 5 is a diagram showing a configuration of an RTP header used in the exemplary embodiment of the present invention.

FIG. 5 shows a configuration of the RTP header used in the exemplary embodiment according to the present invention.

As shown in FIG. 5, the RTP header is configured to include a "v (version)", "p (padding)", "x (expansion)", "cc (CSRC (contributing source identifier) number)", "m (marker)", "pt (payload type)", "seq (sequence number)", "time stamp", "SSRC (sync source identifier)", and "CSRC".

Figure 10:
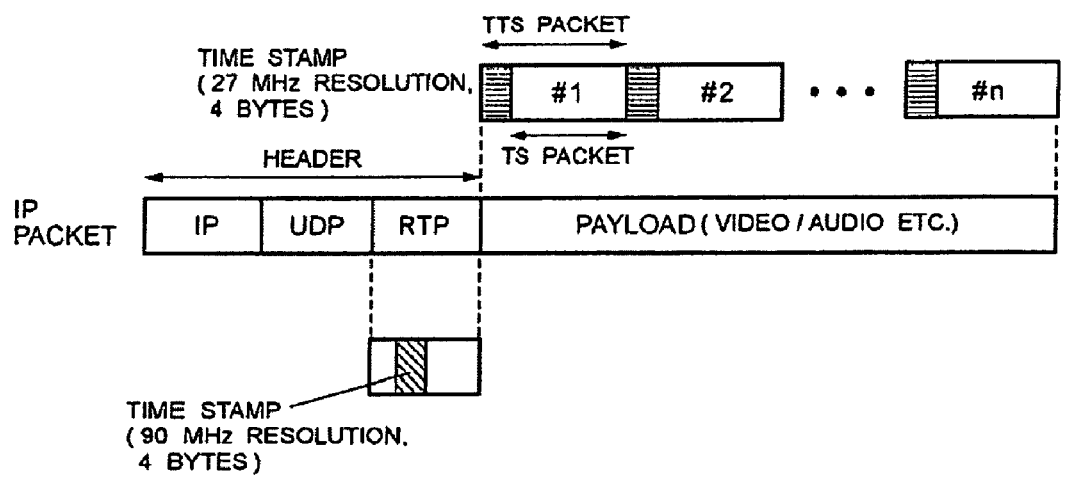
FIG. 10 is a diagram showing a configuration of an IP stream in a system relating to the present invention.
Figure 11:
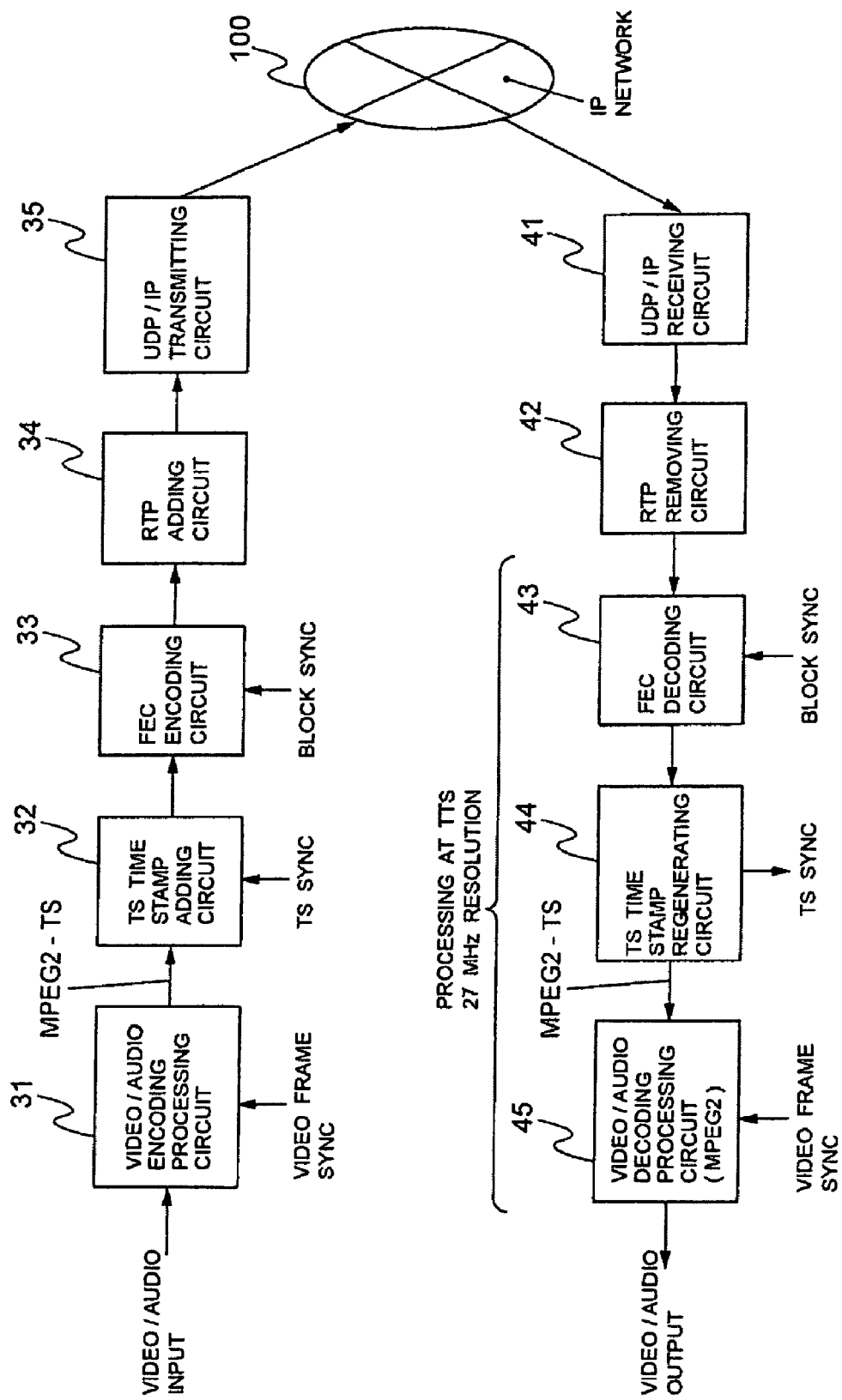
FIG. 11 is a block diagram showing and example configuration of a system which transmits/receives an IP stream, relating to the present invention.
Figure 12:
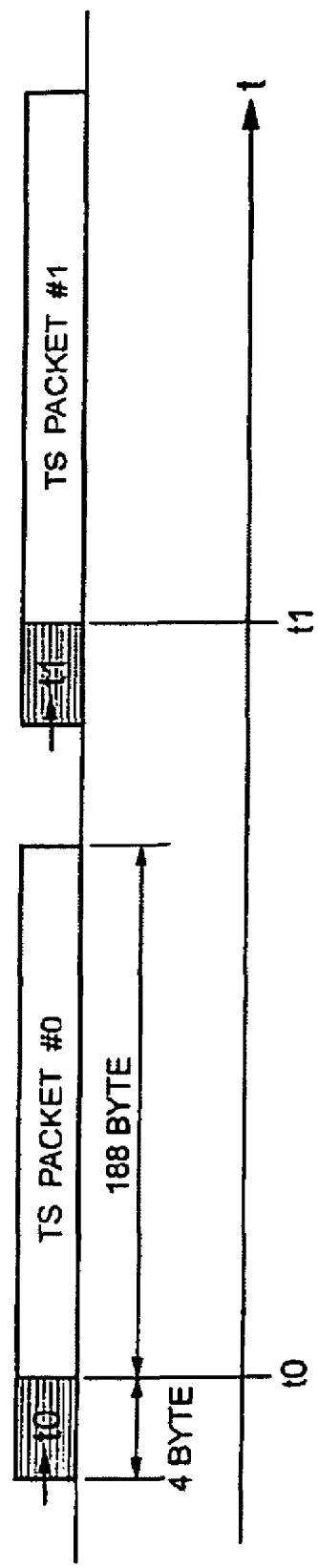
FIG. 12 is a diagram showing an example of addition of a TS time stamp relating to the present invention.
Figure 13:
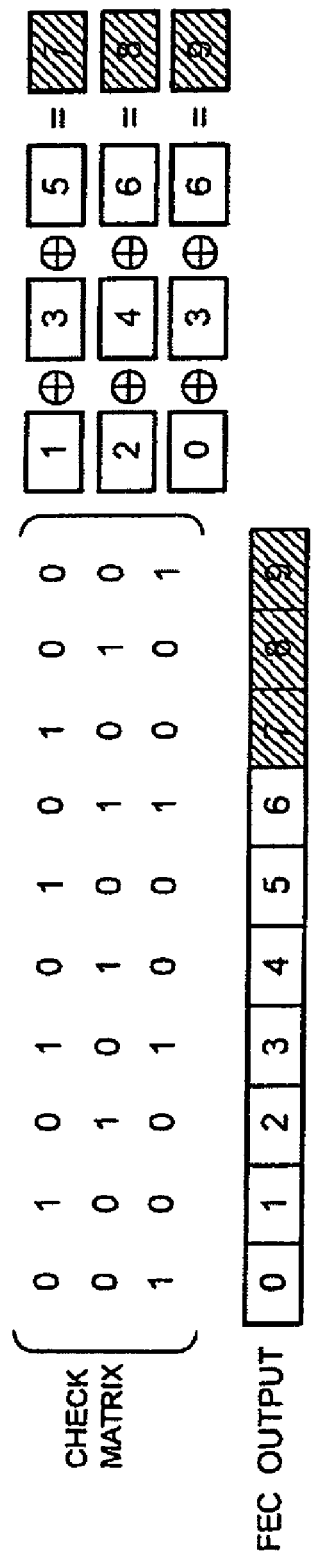
FIG. 13 is a diagram showing an example of FEC processing relating to the present invention.
Figure 14:
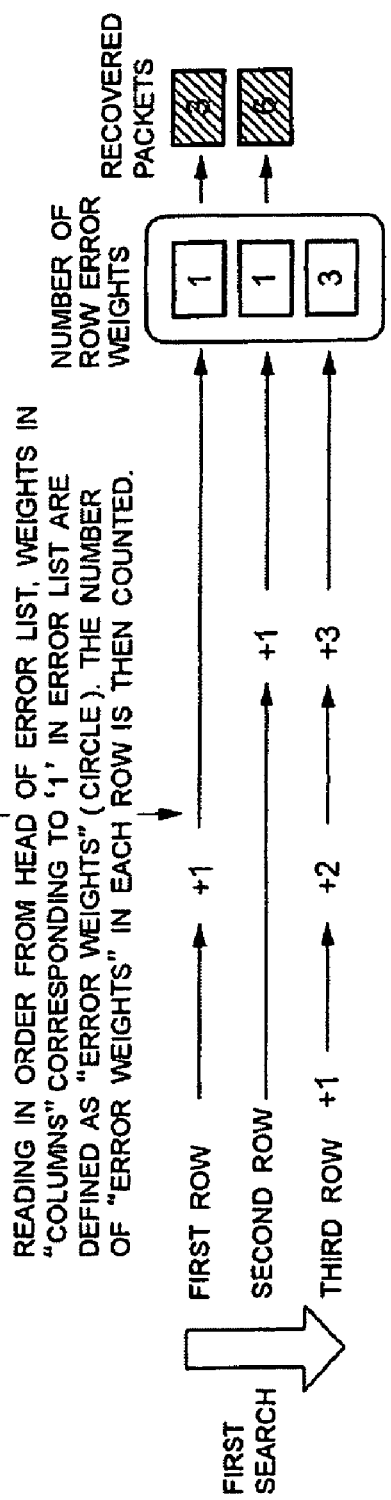
FIG. 14 is a diagram showing an example of FEC processing relating to the present invention.
Figure 15:
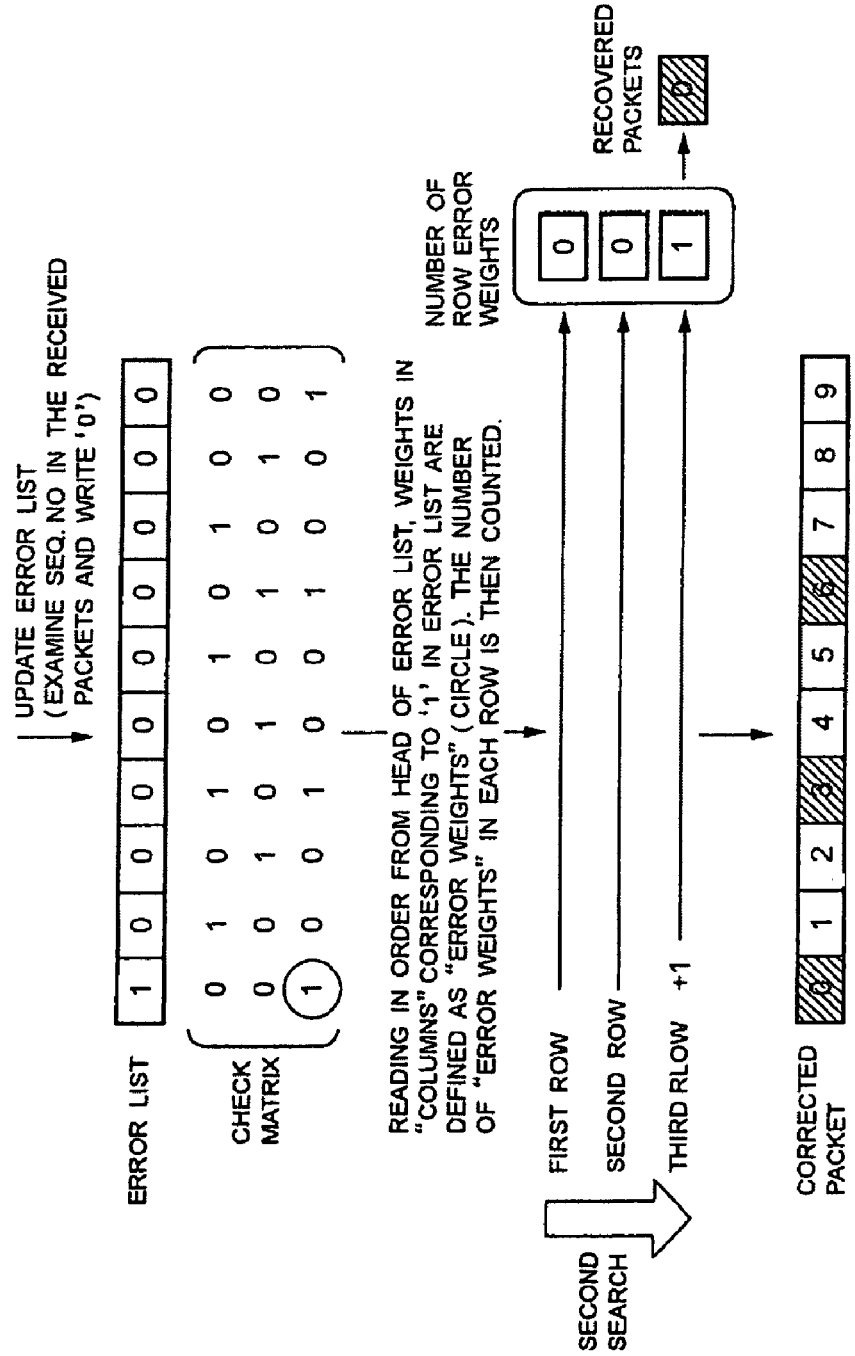
FIG. 15 is a diagram showing an example of FEC processing relating to the present invention.
Figure 16:
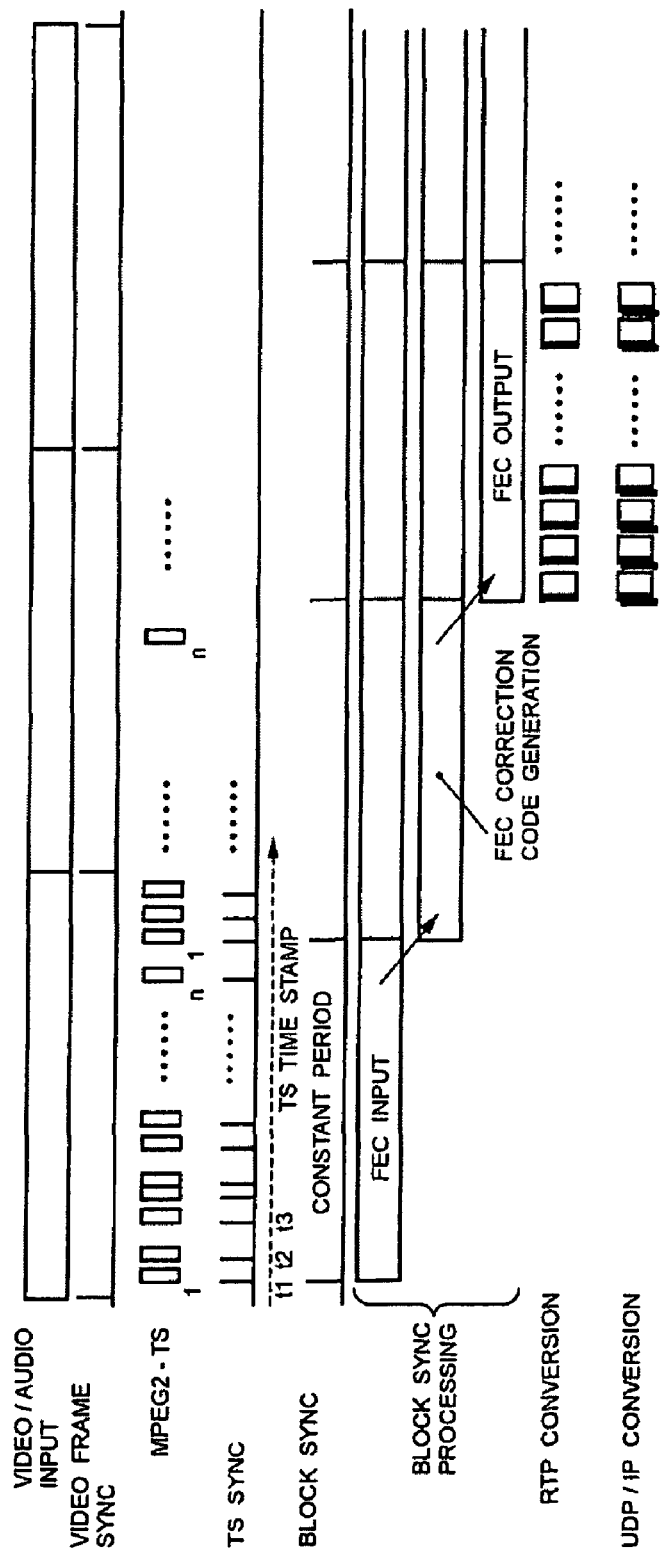
FIG. 16 is a timing chart showing operations on a transmitting side of the system which transmits/receives the IP stream relating to the present invention.
Figure 17:
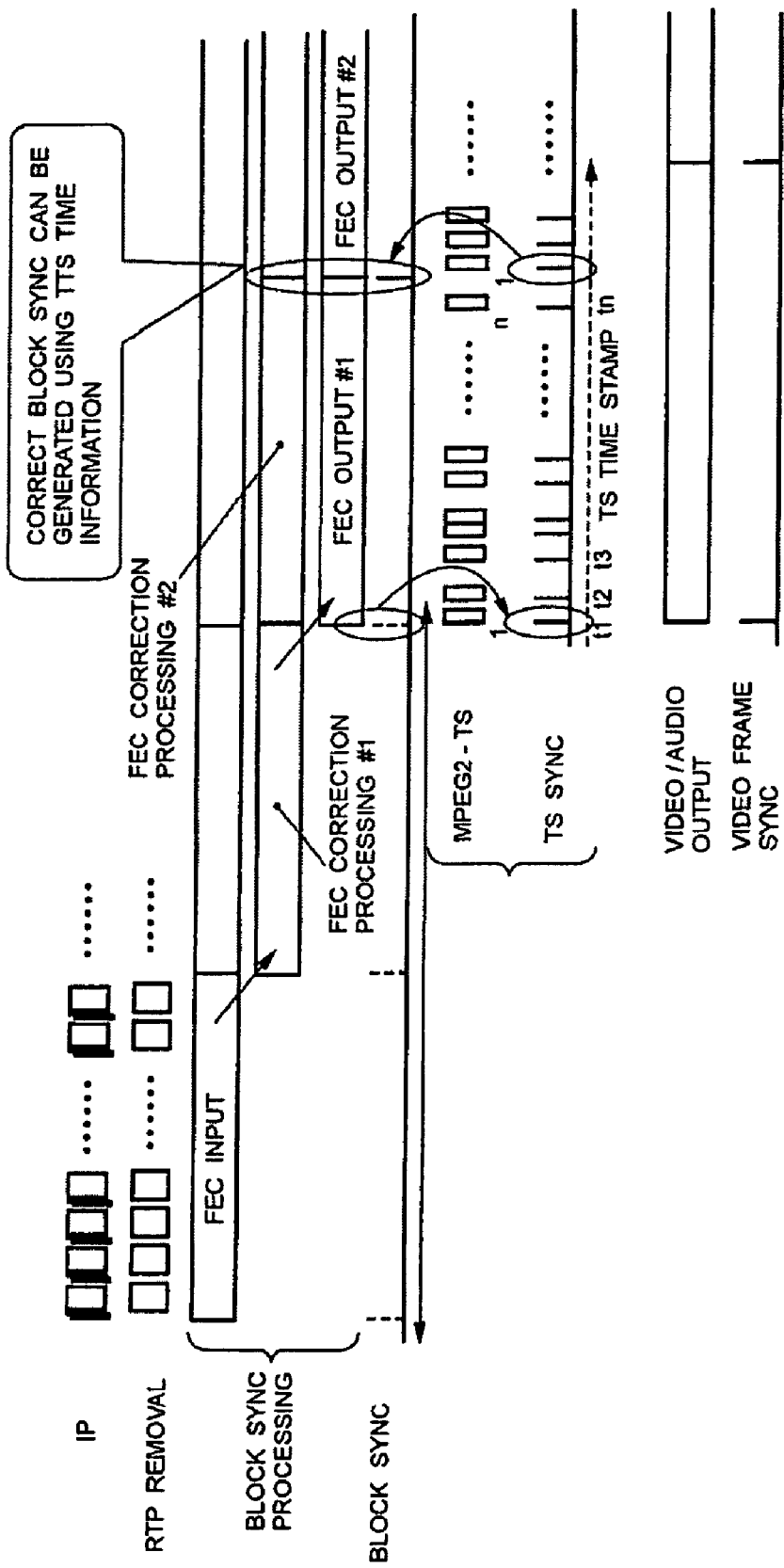
FIG. 17 is a timing chart showing operations on a receiving side of the system which transmits/receives the IP stream relating to the present invention.

The RTP header is, as shown in FIG. 10, added before the "payload (video/audio or the like)", and is made up of a 12-byte (96-bit) fixed header portion ("v", "p", "x", "cc", "m", "pt", "seq", "time stamp", "SSRC") and a 0-byte to 64-byte variable-length header portion which is a CSRC identifier.

Note that the "sequence number" is a field which expresses a sequence position of the RTP packet and is set to increment by one as each packet is transmitted. Use of this field allows the receiving side to detect packet losses and find the packet order. It is recommended that the initial value "sequence number" is set to a random number.

The "time stamp" has written therein timing information for the time point at which the first data of the RTP payload is sampled. On the receiving side, the playback timing is determined by the time stamp. The "time stamp" is unrelated to actual time, and may, when sampling is performed at a fixed frequency, set a sample number.

When the sampling frequency is 90 KHz, the signal is sampled once every approximately 11 μs. If, for instance, one RTP packet is sent every 11 ms, "11 ms/11 μs=1000", the value of the time stamp is increased by 1000 for each packet. Here too, it is recommended that the "time stamp" is initially set to a random number.

Figure 6:
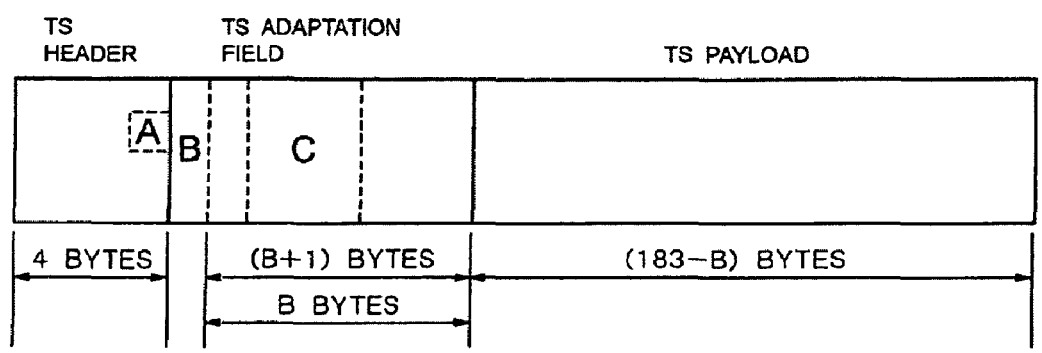
FIG. 6 is a diagram showing a configuration of a TS packet used in the exemplary embodiment of the present invention.

FIG. 6 shows a configuration of the TS packet used in the exemplary embodiment of the present invention. The TS packet shown in FIG. 6 is configured from a "TS header", an "adaptation field", and a "payload". In FIG. 6, "A" in the "TS header" denotes "adaptation field control", "B" in the "adaptation field" denotes an "adaptation field length", and "C" in the "adaptation field" denotes the "PCR".

Figure 7:
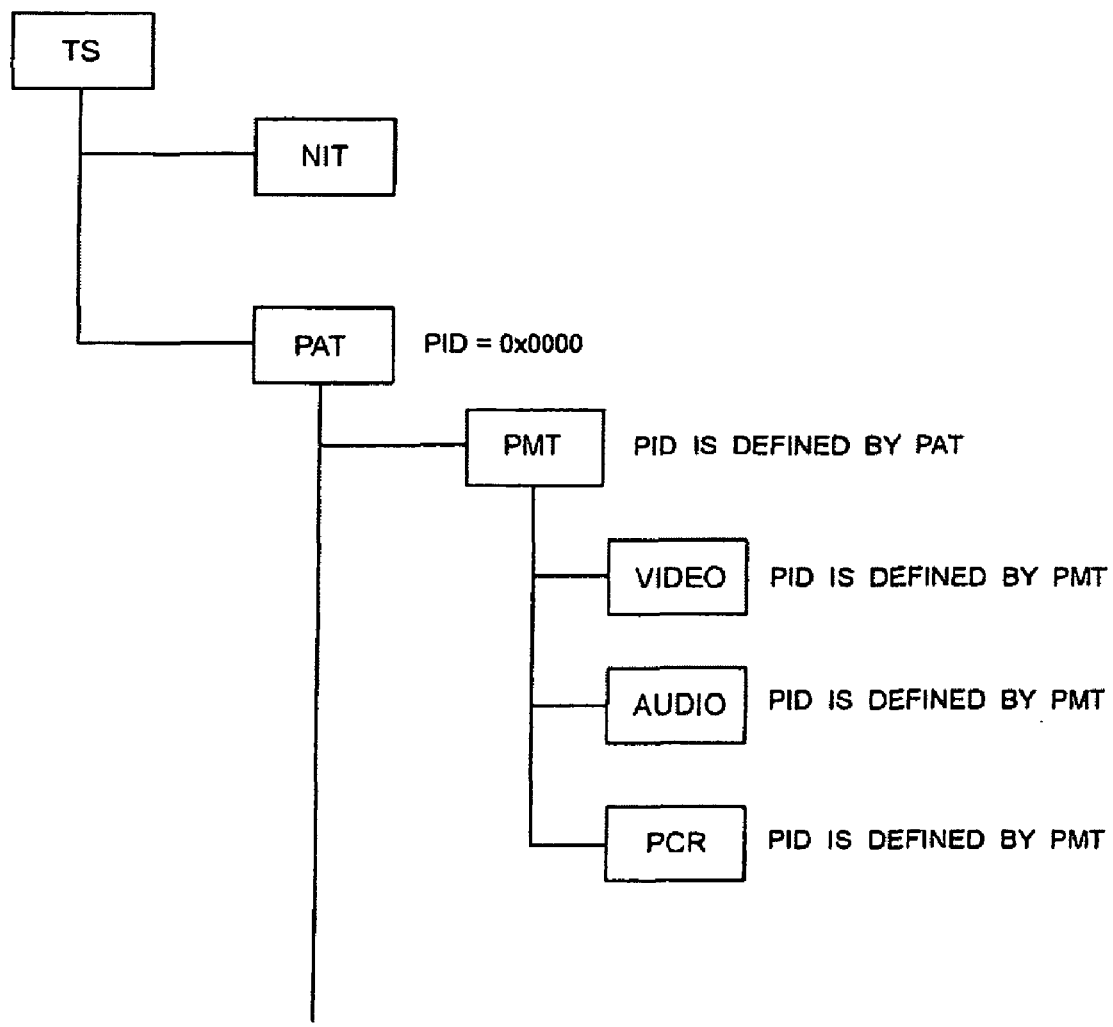
FIG. 7 is a diagram showing a relationship between multiplexing of the TS packets and PIDs used in the exemplary embodiment of the present invention.

FIG. 7 is a diagram showing a relationship between the multiplexing in the TS packet and PID (Packet ID) used in the exemplary embodiment of the present invention. With reference to FIG. 7, the following describes processing to extract the PCR using the PCR extracting circuit 12.

The PID is included in the above-described TS header to distinguish the type of information included in the TS packets. The PCR is included in TS packets having a PCR PID, but there is no fixed mapping between the packet type and the PID value, and so it is necessary to know the PCR PID value in order to find the PCR value. A mapping table which maps between the packet types and the PID values is included in the data of the TS packet. The map table is called a PMT (Program Map Table).

The PID of the TS packets including the PMT data is, like the above-described mapping, non-fixed and is defined in a packet called a PAT (Program Assign Table). Note that the PID of the packet including the PAT is prescribed as '0'.

Hence, the PCR extracting circuit 12 performs processing to extract the PCR. The processing includes (1) searching for a packet having a PID of '0', analyzing the PAT and acquiring the PID of the packet having the PMT, (2) searching for a packet having a PID which matches the acquired PID of the packet having the PMT, analyzing the PMT and acquiring the PID of the packet having the PCR, and (3) searching for a packet having a PID which matches the acquired PID of the packet having the PCR and acquiring the PCR value.

Figure 8:
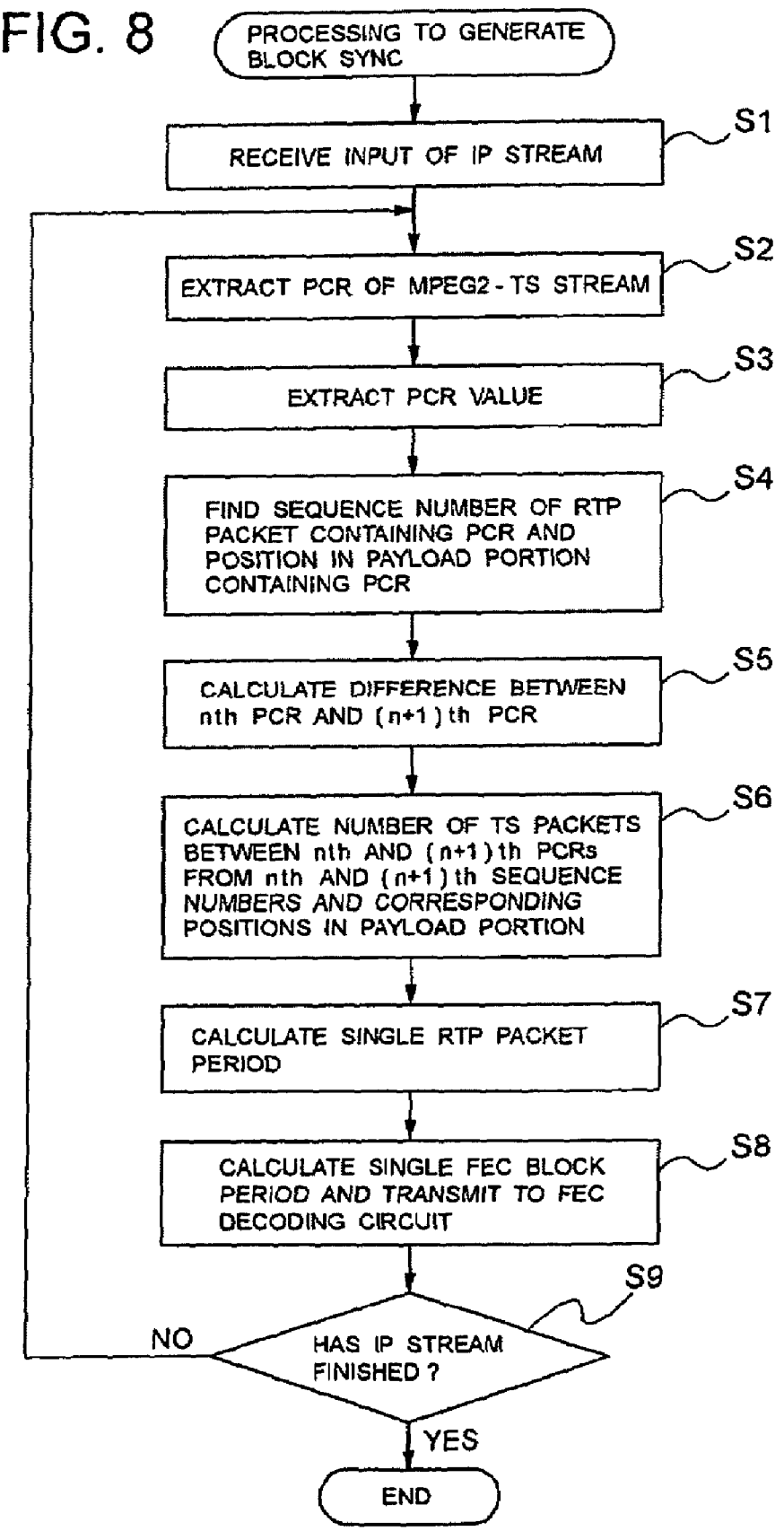
FIG. 8 is a flowchart showing processing to generate block sync using a PCR extracting circuit, an RTP information extracting circuit and a sync calculating circuit of FIG. 4.
Figure 9:
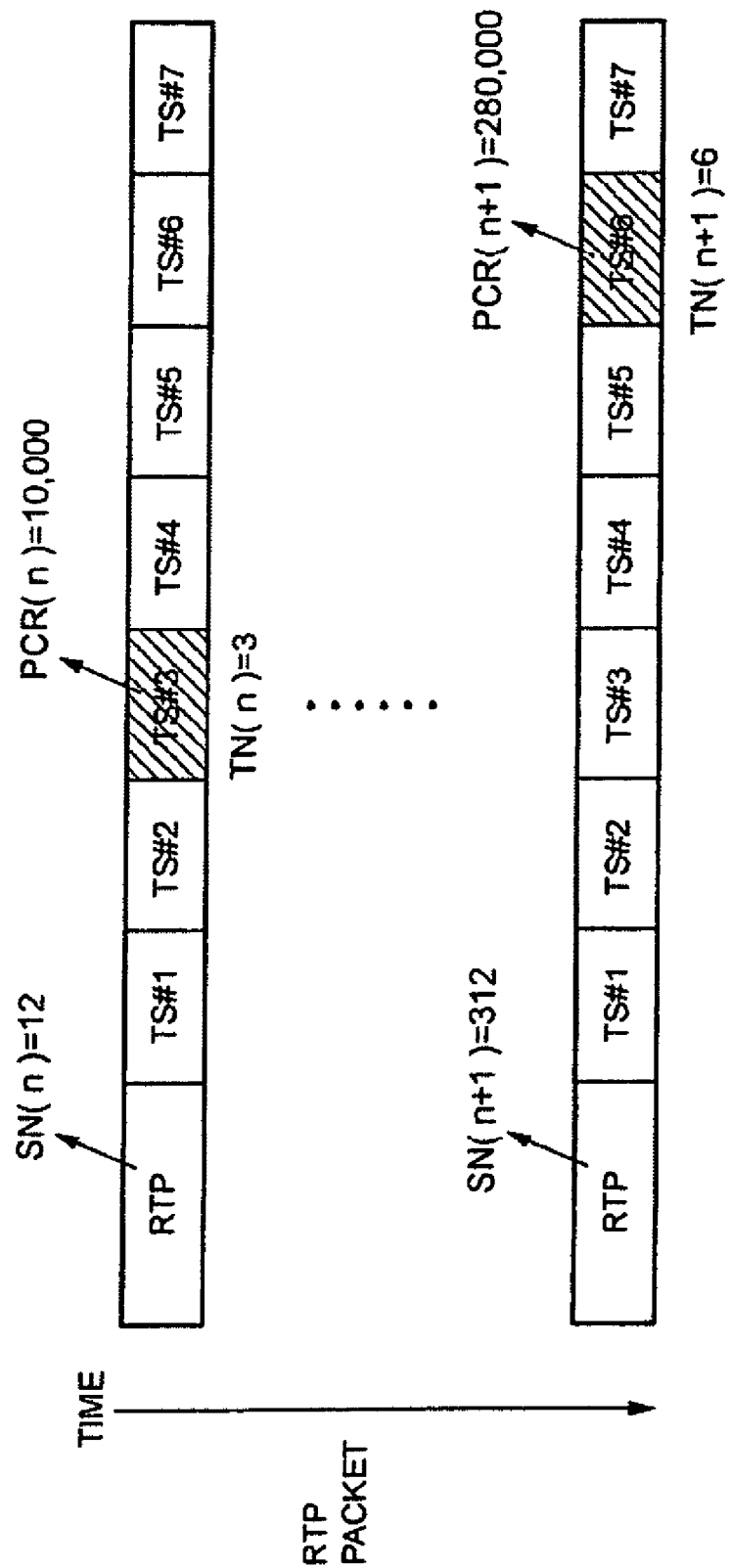
FIG. 9 is a diagram for describing a specific example of the processing to generate the block sync according to the exemplary embodiment of the present invention.

FIG. 8 is a flowchart showing processing to generate the block sync using the PCR extracting circuit 12, the RTP information extracting circuit 13 and the sync calculating circuit 14 in FIG. 4, and FIG. 9 is a diagram for describing a specific example of the processing to generate the block sync according to the exemplary embodiment of the present invention. With reference to FIG. 4 to FIG. 9, the following describes specifics of the processing to generate the block sync according to the exemplary embodiment of the present invention. Note that the processing to generate the block sync using the PCR extracting circuit 12, the RTP information extracting circuit 13 and the sync calculating circuit 14 shown in FIG. 8 can be realized by a computer executing a program in the manner described above.

On input of a reception IP stream (step S1 in FIG. 8), the PCR extracting circuit 12 extracts a packet having a PCR from the MPEG2-TS stream using the above-described procedure (step S2 in FIG. 8), and extracts the PCR value (PCR) (step S3 in FIG. 8).

The RTP information extracting circuit 13 detects the "sequence number" (SN) of the RTP packet containing the PCR extracted by the PCR extracting circuit 12 and a position (i.e. a TS packet number TN in the payload portion) in the payload portion of the RTP packet containing the extracted PCR (step S4 in FIG. 8).

The sync calculating circuit 14 calculates a difference between the nth PCR and (n+1)th PCR (where "n" is a positive integer) PCR (step S5 in FIG. 8). If the nth PCR is denoted PCR(n) and the (n+1)th PCR is denoted PCR(n+1), the PCR difference Dif_PCR(n) is calculated using the following equation.

$$Dif\_PCR(n) = PCR(n+1) - PCR(n)$$

The sync calculating circuit 14 calculates a number of TS packets between the nth and (n+1)th PCRs from the nth and (n+1)th sequence numbers and corresponding positions in the payload portion (step S6 in FIG. 8). If the nth sequence number is denoted SN(n) and the corresponding position in the payload portion denoted TN(n), the (n+1)th sequence number is denoted SN(n+1) and the corresponding position in the payload portion denoted TN(n+1) and the number of TS packets in one RTP packet is denoted TP, the number of TS packets TSN (n) between the PCRs is calculated using the following equation.

$$TSN(n) = [SN(n+1) - SN(n)] \times TP - TN(n) + TN(n+1)$$

Further, the sync calculating circuit 14 calculates the period of a single RTP packet (step S7 in FIG. 8). The single RTP packet period RT(n) is calculated using the following equation.

$$RT(n) = Dif\_PCR(n) / [TSN(n) / TP]$$

Further, the sync calculating circuit 14 calculates the period of a single FEC block and transmits the result to the FEC decoding circuit 16 (step 8 in FIG. 8). If the number of RTP packets in the single FEC block is denoted RP, the single FEC block period FT(n) is calculated using the following equation.

$$FT(n) = RT(n) \times RP$$

The PCR extracting circuit 12, the RTP information extracting circuit 13, the sync calculating circuit 14 repeat the above-described processing (steps S2 to S9 in FIG. 8) until the IP stream finishes (step S9 in FIG. 8).

Next, with reference to FIG. 9, the processing to generate the block sync according to the exemplary embodiment of the present invention is described more specifically. In this example, it is assumed that, in a single RTP packet, the number of TS packets TP=7, and that, in a single FEC block, the number of RTP packets RP=10. The PCR values and the like are assumed to be those in FIG. 9.

First, the PCR difference Dif_PCR(n) is given by $$Dif\_PCR(n) = PCR(n+1) - PCR(n)$$
$$= 280,000 - 10,000$$
$$= 270,000$$

The number of TS packets between the PCRs TSN (n) is given by $$TSN(n) = [SN(n+1) - SN(n)] \times TP - TN(n) + TN(n+1)$$
$$= (312 - 12) \times 7 - 3 + 6$$
$$= 2103$$

The single RTP packet period RT(n) is given by $$RT(n) = Dif\_PCR(n) / [TSN(n) / TP]$$
$$= 270,000 / (2103 / 7)$$
$$\approx 897.7$$

The single FEC block period FT(n) is given by $$FT(n) = RT(n) \times RP$$
$$= 898.7 \times 10$$
$$= 8987$$

An exemplary advantage according to the invention is that by using PCR information periodically added to the MPEG2-TS stream, it is possible to generate highly accurate RTP regeneration sync and FEC block sync. Hence, even when a time-stamp-including TS is not available, the receiving side can stably generate signal timing of the sync implemented on the transmitting side and achieve stability in the processing timing and error correction processing capability.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

What is claimed is:

1. An IP stream communicating system having a receiving apparatus which, when a reception IP (Internet Protocol) stream is inputted, performs at a reception processing timing at least FEC (Forward Error Correction) decoding processing that takes place immediately after reception of the reception IP stream, the IP stream receiving apparatus comprising:
a PCR extracting circuit which extracts a PCR (Program Clock Reference) that has been periodically added into the reception IP stream;
an RTP (Real-time Transport Protocol) information extracting circuit which extracts RTP information from an RTP header in the reception IP stream; and
a sync calculating circuit which generates block sync of the FEC decoding processing based on PCR information extracted by the PCR extracting circuit and the RTP information extracted by the RTP information extracting circuit,
wherein the RTP information includes at least a sequence number of an RTP packet containing the PCR extracted by the PCR extracting circuit and a position in a payload portion of the RTP packet containing the extracted PCR,
and wherein the sync calculating circuit calculates a difference between an nth PCR and an (n+1)th PCR (where n is a positive integer), a number of TS packets between the nth PCR and the (n+1)th PCR, and a single RTP packet period, and calculates a single FEC block period based on the calculated results.

2. The IP stream communicating system according to claim 1, wherein
the PCR extracting circuit analyzes a PAT (Program Assign Table) of the reception IP stream to acquire data of a PMT (Program Map Table), and analyses the PMT to extract a value of the PCR.

3. The IP stream communicating system according to claim 1, wherein
the PCR extracting circuit extracts the PCR information from the RTP packet, and
the RTP information extracting circuit extracts the RTP information from the RTP packet.

4. The IP stream communicating system according to claim 1, wherein
the reception IP stream is at least UPD (User Datagram Protocol) packets of a video and audio stream.

5. The IP stream communicating system according to claim 4, wherein
the video and audio stream is encoded data and uncompressed data including an MPEG2(Moving Pictures Expert Group-2)-TS(Transport Stream).

6. An IP stream receiving apparatus which, when a reception IP (Internet Protocol) stream is inputted, performs at a reception processing timing at least FEC (Forward Error Correction) decoding processing that takes place immediately after reception of the reception IP stream, the IP stream receiving apparatus comprising:
a PCR extracting circuit which extracts a PCR (Program Clock Reference) that has been periodically added into the reception IP stream;
an RTP (Real-time Transport Protocol) information extracting circuit which extracts RTP information from an RTP header in the reception IP stream; and
a sync calculating circuit which generates block sync of the FEC decoding processing based on PCR information extracted by the PCR extracting circuit and the RTP information extracted by the RTP information extracting circuit,
wherein the RTP information includes at least a sequence number of an RTP packet containing the PCR extracted by the PCR extracting circuit and a position in a payload portion of the RTP packet containing the extracted PCR,
and wherein the sync calculating circuit calculates a difference between an nth PCR and an (n+1)th PCR (where n is a positive integer), a number of TS packets between the nth PCR and the (n+1)th PCR, and a single RTP packet period, and calculates a single FEC block period based on the calculated results.

7. The IP stream receiving apparatus according to claim 6, wherein
the PCR extracting circuit analyzes a PAT (Program Assign Table) of the reception IP stream to acquire data of a PMT (Program Map Table), and analyses the PMT to extract a value of the PCR.

8. The IP stream receiving apparatus according to claim 6, wherein
the PCR extracting circuit extracts the PCR information from the RTP packet, and
the RTP information extracting circuit extracts the RTP information from the RTP packet.

9. The IP stream receiving apparatus according to claim 6, wherein
the reception IP stream is at least UDP (User Datagram Protocol) packets of a video and audio stream.

10. The IP stream receiving apparatus according to claim 9, wherein
the video and audio stream is encoded data and non-compressed data which include an MPEG2(Moving Pictures Expert Group-2)-TS(Transport Stream).

11. A reception processing timing sync method executed by an IP stream receiving apparatus which, when a reception IP (Internet Protocol) stream is inputted, performs at a reception processing timing at least FEC (Forward Error Correction) decoding processing that takes place immediately after reception of the reception IP stream, the reception processing sync method comprising:
PCR extracting processing performed by a first circuit of the IP stream receiving apparatus for extracting a PCR (Program Clock Reference) that has been periodically added into the reception IP stream;
RTP (Real-time Transport Protocol) information extracting processing performed by a second circuit of the IP stream receiving apparatus for extracting RTP information from an RTP header in the reception IP stream; and
sync calculating processing performed by a third circuit of the IP stream receiving apparatus for generating block sync of the FEC decoding processing based on PCR information extracted in the PCR extracting processing and the RTP information extracted in the RTP information extracting processing,
wherein the RTP information includes at least a sequence number of an RTP packet containing the PCR extracted in the PCR extracting processing and a position in a payload portion of the RTP packet containing the extracted PCR,
and wherein in the sync calculating processing, the IP stream receiving apparatus calculates a difference between an nth PCR and an (n+1)th PCR (where n is a positive integer), a number of TS packets between the nth PCR and the (n+1)th PCR, and a single RTP packet period, and calculates a single FEC block period based on the calculated results.

12. The reception processing timing sync method according to claim 11, wherein
in the PCR extracting processing, the IP stream receiving apparatus analyzes a PAT (Program Assign Table) of the reception IP stream to acquire data of a PMT (Program Map Table), and analyses the PMT to extract a value of the PCR.

13. The reception processing timing sync method according to claim 11, wherein
the IP stream receiving apparatus
extracts, in the PCR extracting processing, the PCR information from the RTP packet, and
extracts, in the RTP information extracting processing, the RTP information from the RTP packet.

14. The reception processing timing sync method according to claim 11, wherein
the reception IP stream is at least UPD (User Datagram Protocol) packets of a video and audio stream.

15. The reception processing timing sync method according to claim 14, wherein
the video and audio stream is encoded data and uncompressed data including an MPEG2(Moving Pictures Expert Group-2)-TS(Transport Stream).

16. A non-transitory recording medium having recorded therein a program for a computer in an IP stream receiving apparatus which, when a reception IP (Internet Protocol) stream is inputted, performs at a reception processing timing at least FEC (Forward Error Correction) decoding processing that takes place immediately after reception of the reception IP stream, the program causing the computer to execute:
PCR extracting processing for extracting a PCR (Program Clock Reference) that has been periodically added into the reception IP stream;
RTP (Real-time Transport Protocol) information extracting processing for extracting RTP information from an RTP header in the reception IP stream; and
sync calculating processing for generating block sync of the FEC decoding processing based on PCR information extracted in the PCR extracting processing and the RTP information extracted by the RTP information extracting processing,
wherein the RTP information includes at least a sequence number of an RTP packet containing the PCR extracted in the PCR extracting processing and a position in a payload portion of the RTP packet containing the extracted PCR,
and wherein in the sync calculating processing, the IP stream receiving apparatus calculates a difference between an nth PCR and an (n+1)th PCR (where n is a positive integer), a number of TS packets between the nth PCR and the (n+1)th PCR, and a single RTP packet period, and calculates a single FEC block period based on the calculated results.

17. An IP stream communicating system having a receiving apparatus which, when a reception IP (Internet Protocol) stream is inputted, performs at a reception processing timing at least FEC (Forward Error Correction) decoding processing that takes place immediately after reception of the reception IP stream, the IP stream receiving apparatus comprising:
a PCR extracting means of extracting a PCR (Program Clock Reference) that has been periodically added into the reception IP stream;
an RTP (Real-time Transport Protocol) information extracting means of extracting RTP information from an RTP header in the reception IP stream; and
a sync calculating means of generating block sync of the FEC decoding processing based on PCR information extracted by the PCR extracting means and the RTP information extracted by the RTP information extracting means,
wherein the RTP information includes at least a sequence number of an RTP packet containing the PCR extracted by the PCR extracting circuit and a position in a payload portion of the RTP packet containing the extracted PCR,
and wherein the sync calculating means calculates a difference between an nth PCR and an (n+1)th PCR (where n is a positive integer), a number of TS packets between the nth PCR and the (n+1)th PCR, and a single RTP packet period, and calculates a single FEC block period based on the calculated results.

18. An IP stream receiving apparatus which, when a reception IP (Internet Protocol) stream is inputted, performs at a reception processing timing at least FEC (Forward Error Correction) decoding processing that takes place immediately after reception of the reception IP stream, the IP stream receiving apparatus comprising:
- a PCR extracting means which extracts a PCR (Program Clock Reference) that has been periodically added into the reception IP stream;
- an RTP (Real-time Transport Protocol) information extracting means which extracts RTP information from an RTP header in the reception IP stream; and
- a sync calculating means which generates block sync of the FEC decoding processing based on PCR information extracted by the PCR extracting means and the RTP information extracted by the RTP information extracting means, wherein the RTP information includes at least a sequence number of an RTP packet containing the PCR extracted by the PCR extracting circuit and a position in a payload portion of the RTP packet containing the extracted PCR, and wherein the sync calculating means calculates a difference between an nth PCR and an (n+1)th PCR (where n is a positive integer), a number of TS packets between the nth PCR and the (n+1)th PCR, and a single RTP packet period, and calculates a single FEC block period based on the calculated results.

* * * * *